US009776545B1

United States Patent
(12) United States Patent
Lovasz

(10) Patent No.: US 9,776,545 B1
(45) Date of Patent: Oct. 3, 2017

(54) ATTACHMENT PORT

(71) Applicant: Lear Corporation, Southfield, MI (US)

(72) Inventor: Eric Lovasz, Southgate, MI (US)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 15/085,493

(22) Filed: Mar. 30, 2016

(51) Int. Cl.
*B60N 2/72* (2006.01)
*B60N 2/64* (2006.01)
*B60N 2/70* (2006.01)

(52) U.S. Cl.
CPC ................. *B60N 2/72* (2013.01); *B60N 2/64* (2013.01); *B60N 2/70* (2013.01)

(58) Field of Classification Search
CPC ............... B60N 2/70; B60N 2/72; B60N 2/64
See application file for complete search history.

(56) References Cited

U.S. PATENT DOCUMENTS 5,605,373 A 2/1997 Wildern, IV et al.
5,882,073 A 3/1999 Burchi et al.
5,993,955 A 11/1999 Mense
6,027,171 A 2/2000 Partington et al.
6,899,399 B2 5/2005 Ali et al.
7,481,489 B2 1/2009 Demick
7,487,575 B2 * 2/2009 Smith .................. B60N 2/5825 24/297
7,946,649 B2 5/2011 Galbreath et al.
8,528,984 B2 * 9/2013 Galbreath ............ B60N 2/5825 24/297
8,662,483 B2 * 3/2014 Yamaguchi ............ B60N 2/002 267/102
8,998,310 B2 4/2015 Lovasz et al.
2008/0258523 A1 * 10/2008 Santin .................. B60N 2/5825 297/218.2
2009/0184551 A1 * 7/2009 Samain .................... B60N 2/66 297/284.1
2012/0174352 A1 7/2012 Tsunoda
2013/0119715 A1 * 5/2013 Medoro ................. B60N 2/686 297/180.1
2014/0068900 A1 * 3/2014 Lovasz ................ A47C 31/023 24/543
2015/0203010 A1 * 7/2015 Line ....................... B60N 2/504 297/452.18
2015/0343932 A1 * 12/2015 Hosoe ...................... B60N 2/72 297/452.52

FOREIGN PATENT DOCUMENTS

DE 29821697 U1 2/1999

* cited by examiner

*Primary Examiner* — Philip Gabler
(74) *Attorney, Agent, or Firm* — Brooks Kushman P.C.

(57) ABSTRACT

A seat attachment assembly for attaching components to a seat cushion is provided. A central base has at least one footing with an opening adapted for being encapsulated in the cushion. A cylindrical shaft extends generally perpendicular from the central base and defines a cylindrical opening therein. A retention clip has an extension portion sized to be received and retained in the cylindrical opening by an interference fit.

20 Claims, 3 Drawing Sheets

ATTACHMENT PORT

TECHNICAL FIELD

This application relates to a seat attachment port for attaching components to a foam cushion.

BACKGROUND

U.S. Pat. No. 8,998,310 by Lear Corporation, issued on Apr. 7, 2015, illustrates and discloses a retention clip.

SUMMARY

In at least one embodiment, a seat cushion assembly is provided. An attachment port is molded in the seat cushion. The attachment port includes at least one footing having an opening so that the seat cushion encapsulates the footing and seat cushion material extends through the opening. The attachment port has a cylindrical shaft extending generally perpendicular from the footing and defining a cylindrical opening therein. The seat cushion material contacts an outer circumference along at least a portion of the length of the cylindrical shaft.

In another embodiment, at least a portion of the length of the cylindrical shaft extends beyond an exterior surface of the seat cushion.

In one other embodiment, a distal end of the cylindrical shaft is coplanar with an exterior surface of the seat cushion.

In a further embodiment, the at least one footing includes a plurality of webbed fingers that define a webbed opening to provide greater retention in the seat cushion.

In another embodiment, the attachment port also includes first and second footings disposed in the cushion and extending from the central base in a direction generally perpendicular from the cylindrical shaft.

In another embodiment, the assembly includes a retention clip having an extension portion sized to be received and retained in the cylindrical opening by an interference fit.

In at least one embodiment, a seat assembly is provided having a seat back having a seat cushion. An attachment port is molded in the seat cushion. The attachment port includes a central base encapsulated in the cushion for retaining the attachment port to the cushion. At least one footing extends from the central base and has an opening so that the seat cushion encapsulates the footing and seat cushion material extends through the opening. A cylindrical shaft extends generally perpendicular from the footing and defines a cylindrical opening therein. The seat cushion material contacts an outer circumference along at least a portion of the length of the cylindrical shaft. A retention clip having an extension portion is sized to be received and retained in the cylindrical opening by an interference fit to secure a component to the seat back.

In one other embodiment, the attachment port includes a detent extending radially inward along a circumference of the cylindrical opening.

In another embodiment, the retention clip includes at least one tooth that extends radially from the extension portion, the at least one tooth engages the detent by a snap-fit.

In a further embodiment, the retention clip includes a connection portion for securing the retention clip to the component.

In another embodiment, the connection portion includes an arc-shaped profile for being coupled to a bar.

In yet another embodiment, the connection portion is coupled to a wiring harness.

In another embodiment, wherein first and second footings that are spaced apart from each other and have an arcuate arm with a web defined within the arcuate arm.

In one other embodiment, the attachment port extends from a rear surface of the seat back.

In at least one other embodiment, a seat attachment assembly for attaching components to a seat cushion is provided. A central base has at least one footing with an opening adapted for being encapsulated in the cushion. A cylindrical shaft extends generally perpendicular from the central base and defines a cylindrical opening therein. A retention clip has an extension portion sized to be received and retained in the cylindrical opening by an interference fit.

BRIEF DESCRIPTION OF THE DRAWINGS

Certain embodiments of the present disclosure are pointed out herein. However, other features of the various embodiments will become more apparent and will be further understood by referring to the following detailed description in conjunction with the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
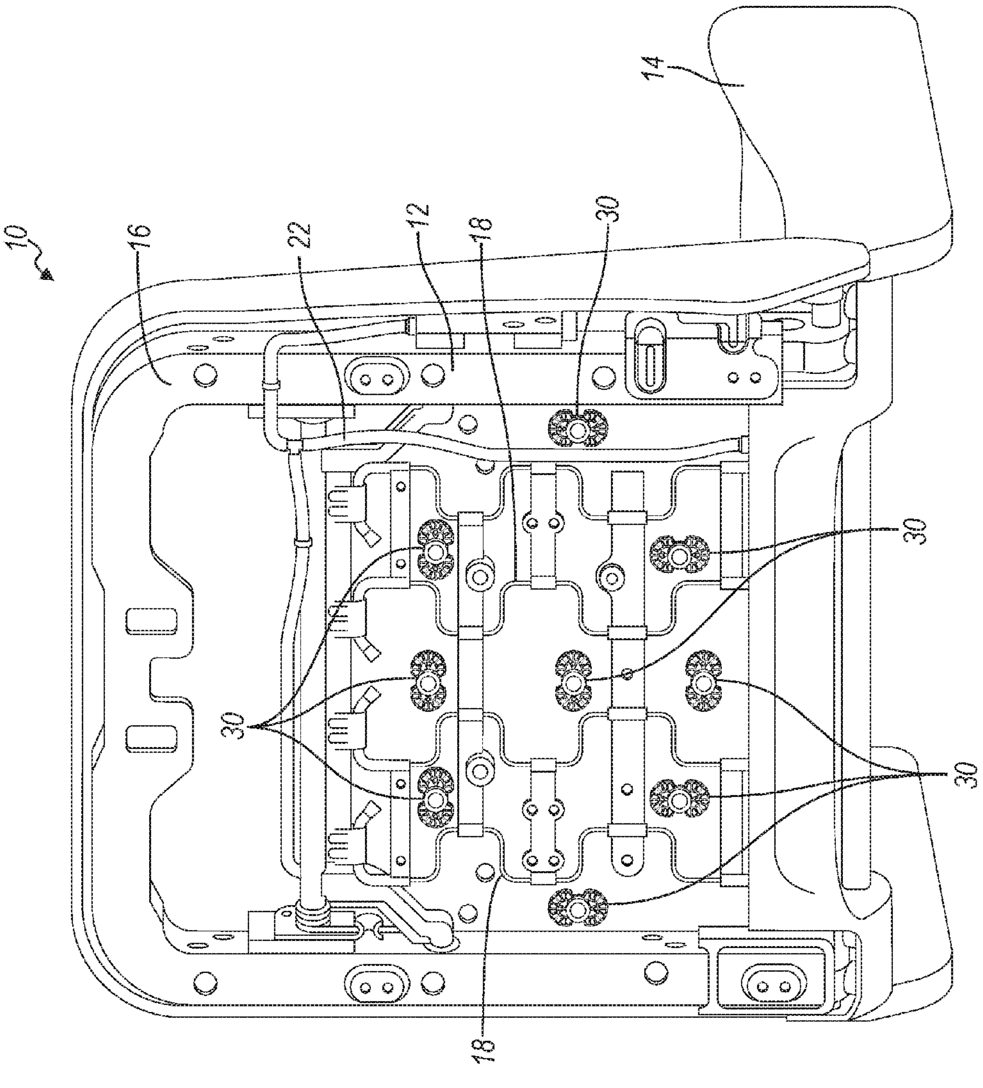
FIG. 1 illustrates a perspective view of a portion of a seat assembly including a plurality of attachment ports.
Figure 2:
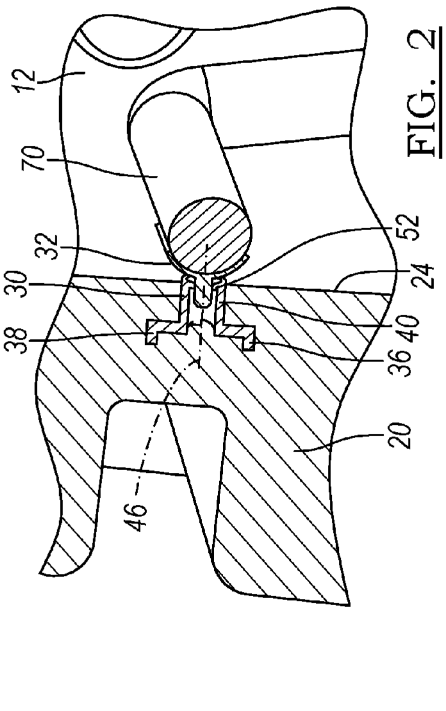
FIG. 2 illustrates a perspective view of a portion of a seat assembly utilizing a attachment port assembly.

Referring to FIGS. 1 and 2, a portion of a seat assembly 10 is shown. As shown in FIG. 1, a portion of a vehicle seat back 12 and seat bottom 14 are illustrated. The seat assembly 10 may be configured for use in a vehicle, such as a car or truck. In addition, the seat assembly 10 may be configured for non-vehicular applications.

FIG. 1 illustrates the rear-facing portion of the seat back 12 having the trim cover and seat cushion 20 removed. As shown the seat back 12 and the seat bottom 14 may have numerous components such as a support structure, including a seat frame 16 and/or support wires 18 that may define a suspension mat. In addition the seat back 12 and seat bottom 14 may have wire bundles 22 routed to control features in the seat assembly 10.

With so many components required to be disposed in the seat assembly 10, it can be difficult to provide additional attachment locations. The attachment port 30 is provided to be secured directly to the cushion in areas where other mechanical attachment features or space are not available. As shown in FIG. 1, the attachment port 30 may be disposed at any number of locations adjacent other components by being secured directly to the foam cushion.

A cushion 20, as shown in FIG. 2, is supported by the support structure and is provided to fill in around the components in the seat to provide a comfortable seating surface. The cushion 20 may be made of any suitable material, such as foam. As shown in FIG. 2, the attachment port 30 may be imbedded in the foam and encapsulated in the cushion 20.

The attachment port 30 is shown in more detail in FIG. 2-8. The attachment port 30 may be configured to engage one or more retention clips 32 to provide localized retention of components to the seat assembly 10, as shown in FIG. 2.

Figure 3:
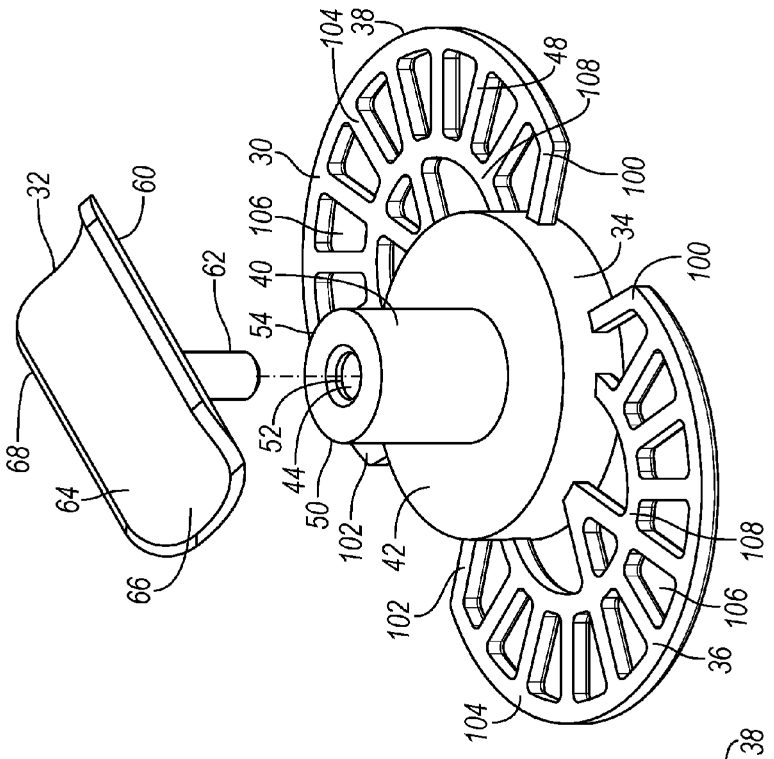
FIG. 3 is an exploded perspective view of the attachment port assembly shown in FIG. 2.

As shown in more detail in FIG. 3, in at least one embodiment, the attachment port 30 includes a central base 34. The central base 34 is disposed proximate a center of the attachment port 30. In the embodiment shown, the central base 34 is configured as a generally cylindrical disk, although other geometries are contemplated. A first footing 36 and a second footing 38 extend radially from the side wall of the central base 34. A cylindrical shaft 40 extends generally perpendicularly from the top planar surface 42 of the central base 34. A cylindrical opening 44 is defined in cylindrical shaft 40 and extends through the central base 34. A central axis 46 of the cylindrical shaft 40 and cylindrical opening 44 are collinear with the center of the central base 34.

The cylindrical shaft 40 and cylindrical opening 44 define a retention port 50 for retaining the retention clip 32. As shown in the cross section in FIG. 2, the cylindrical opening 44 includes a detent 52 defined at a distal end 54 of the opening 44. The detent 52 provides a restriction to the opening 44 to retain a retention clip with an interference fit. For example, as shown in FIG. 3, the retention port 50 may receive a retention clip 60 having an extension portion 62 that is inserted into the cylindrical opening 44 and is engaged by the detent 52. The extension portion 62 is sized to have an interference fit with the cylindrical opening 44. The detent 52 may define a narrower opening so that that the detent 52 flexes inward into the cylindrical opening 44 as the extension portion 62 is inserted. The deformation of the detent 52 and the friction between the detent 52 and the extension portion 62 prevents the retention clip 60 from being removed.

The body 64 of the clip may be shaped to hold various components that are required to be attached to the seat 10. As shown in FIG. 3, the body 64 has an arc-shaped profile 66 that extends linearly along a length 68. The arc-shaped profile 66 and linear length cooperate with a rod or bar 70 that is required to be attached to the seat 10, as shown in FIG. 2. The body 64 may be attached to the bar 70 through welding, brazing or adhesive, or integrally formed with the bar 70 by any suitable method. Components that can be attached via a suitably-shaped clip 32 also include, among other things, wires, wire bundles, and pneumatic tubes.

Figure 4:
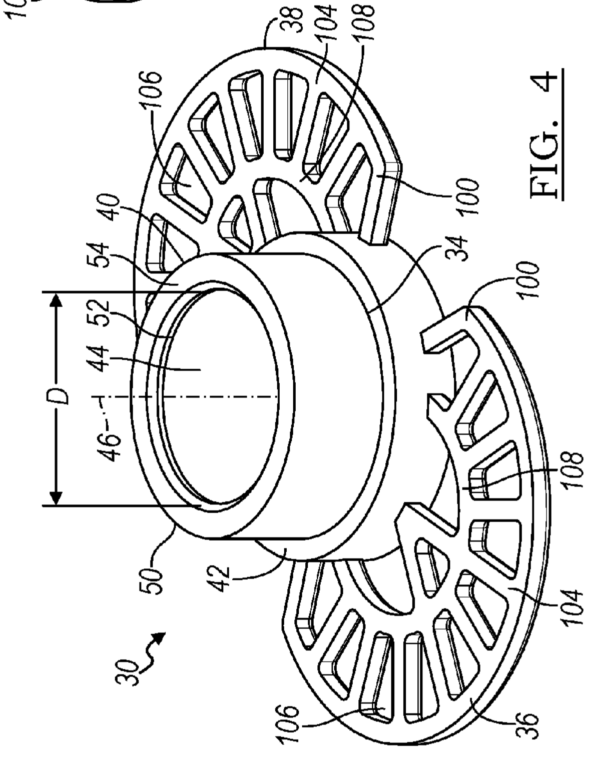
FIG. 4 is a perspective view of an attachment port according to another embodiment.

As shown in FIG. 4, the diameter D of the cylindrical opening 44 may vary for different applications to receive different sized retention clips 32 or to provide greater retention force. For example, the diameter D may be approximately 6 mm. In other embodiments, shown in FIGS. 3 and 4, the diameter D may be between 4 mm and 20 mm, however, any suitable diameter may be utilized that accommodates various clips 32 in different applications.

Figure 5:
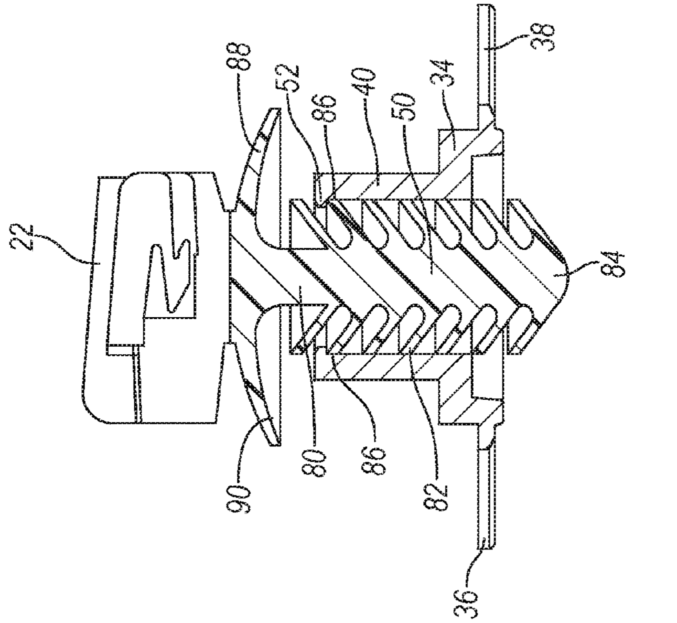
FIG. 5 is a section view of an attachment port assembly according to another embodiment.

In another embodiment illustrated in FIG. 5, the retention port 50 may receive a retention clip 80 with a snap-fit. The retention clip 80 has a plurality of flexible teeth 82 that extend at an angle from the extension portion 84. When extension portion 84 is inserted into the cylindrical opening 44, the teeth 82 flex inward as they contact detent 52. The teeth 82 resiliently return to their un-flexed position so that the detent 52 engages a contact surface 86 on the teeth to prevent the clip 80 from being removed. The retention clip 80 may have a single tooth 82, or a plurality of teeth positioned along the extension portion 84. The teeth 82 may extend around the circumference of the extension portion 84, or may only form a portion of the circumference.

The retention clip 80 may include an attachment body 88 to hold various components that are required to be attached to the seat 10. For example, the attachment body 88 may be configured to be attached to a wire harness. The retention clip 80 may also have a flange 90 from which the extension portion 84 extends. The flange 90 has a diameter that is at least the diameter of the cylindrical opening 44 to conceal the retention port 50.

The first and second footings 36, 38 extend in a radial direction from the central base 34. The first and second footings 36, 38 engage the cushion 20 and provide sufficient surface area to anchor or inhibit removal of the attachment port 30.

As shown in FIG. 2, in at least one embodiment, the first and second footings 36, 38 may be encapsulated within the cushion 20. For example, the attachment port 30 may be positioned in a mold and the cushion material may be injected, molded, and cured around the first and second footings 36, 38 to secure the attachment port 30 in a predetermined location in the cushion 20. The cushion 20 may be formed of any suitable material, such as foam. In another embodiment, the first and second footings 36, 38 may be disposed underneath or along a surface of the cushion 20 without being disposed inside the cushion 20 so that only a top surface 48 of the footings 36, 38 contacts the surface of the cushion. In either case, the first and second footings 36, 38 may distribute load forces and inhibit the attachment port 30 from being removed or disconnected from the cushion 20.

As shown in FIGS. 3-4, in at least one embodiment, the first and second footings 36, 38 may be configured as mirror images of each other about a center line of the base 34. As such, the first and second footings 36, 38 may be disposed on opposite sides of the central base 34. In addition, the first and second footings 36, 38 may be spaced apart from each other to permit the first and second footings 36, 38 to independently flex. The first and second footings 36, 38 may be integrally formed with the base 34. In addition, the top surface 42 of the base 34 is generally parallel to the top surface 48 of the first and second footings 36, 38.

In at least one embodiment, the first and second footings 36, 38 are defined by a first footing arm 100 and a second footing arm 102 that extend radially from the base 34. An arcuate arm 104 connects the first and second footing arms 100, 102. In at least one embodiment, the arcuate arm 104 may have a constant radius of curvature. As such, the arcuate arm 104 may cooperate with the central base 34, first arm 100, and second arm 102 to at least partially define a footing opening 106. In at least one embodiment, the first and second footings 36, 38 have a plurality of arms defining a web 108 within the opening 106. The web 108 provides greater surface area thereby providing greater retention when the attachment port 30 is encapsulated within the cushion 20, while still allowing the cushion material to flow through the openings 106. The web 108 and openings 106 may have any configuration, such as those disclosed in U.S. Pat. No. 8,998,310 by Lear Corporation, the disclosure of which is hereby incorporated by reference in its entirety.

It is contemplated that the footings 36, 38 may be any suitable shape and have any suitable web. For example, in one embodiment, a footing may be offset radially from the base 34 and extend completely around the base 34 in an elliptical, circular, oval complex curvature profile. The shape or profile of the footing may be determined based on space constraints in the seat assembly or retention force requirements, or other application considerations.

While the central base 34 and first and second footings 36, 38 are encapsulated in the cushion 20 to retain the attachment port to the seat 10, the cylindrical shaft 40 may extend beyond an exterior surface 24 of the seat cushion 20. By extending above the exterior surface 24, the retention port 50 can be easily accessed to allow components to be secured along the seat 10. In another embodiment, as shown in FIG. 2, the distal end 54 of the retention port 50 may be coplanar, or flush, with the exterior surface 24 of the cushion 20.

Figure 6:
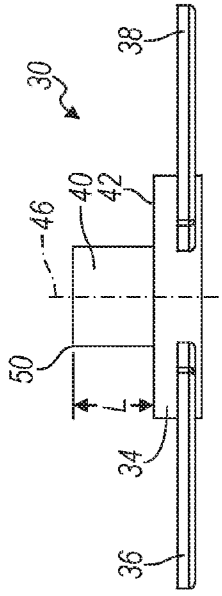
FIG. 6 is a side view of the attachment port according to one embodiment.
Figure 7:
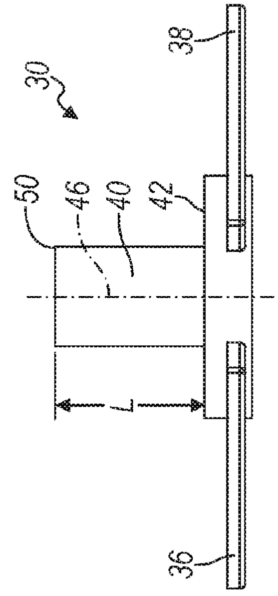
FIG. 7 is a side view of the attachment port according to another embodiment.
Figure 8:
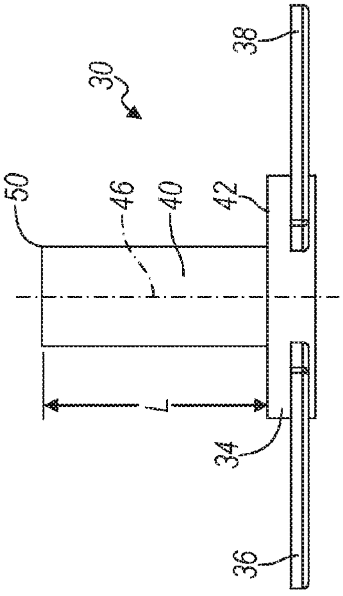
FIG. 8 is a side view of the attachment port according to another embodiment.

As shown in FIGS. 6-8, the length L of the cylindrical shaft 40 may vary for different applications. For example, the length L may vary based on the thickness of the cushion 20 in which the attachment port is encapsulated within. The length L may also vary to receive different sized retention clips 32 for different components or to provide greater retention force.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat cushion assembly comprising:
a seat cushion;
an attachment port molded in the seat cushion, the attachment port including:
at least one footing having an opening so that the seat cushion encapsulates the footing and seat cushion material extends through the opening; and
a cylindrical shaft extending generally perpendicular from the footing and defining a cylindrical opening therein, wherein the cylindrical shaft extends a distance so a distal end is at least coplanar with an exterior surface of the seat cushion,
wherein the seat cushion material contacts an outer circumference along at least a portion of a length of the cylindrical shaft.

2. The seats cushion assembly of claim 1 wherein at least a second portion of the length of the cylindrical shaft extends beyond an exterior surface of the seat cushion.

3. The seat cushion assembly of claim 1 wherein the at least one footing includes a plurality of webbed fingers that defines a plurality of webbed openings, the search cushion material extending through the plurality webbed openings to provide retention in the seat cushion.

4. The seat cushion assembly of claim 1 wherein the attachment port further comprises first and second footings disposed in the seat cushion and extending in a direction generally perpendicular from the cylindrical shaft.

5. The seat cushion assembly of claim 1 further comprising a retention clip having an extension portion sized to be received and retained in the cylindrical opening by an interference fit.

6. A seat assembly comprising:
a seat back having a seat cushion;
an attachment port molded in the seat cushion, the attachment port including:
a central base encapsulated in the seat cushion for retaining the attachment port to the cushion;
at least one footing extending from the central base and having an opening so that the seat cushion encapsulates the footing and seat cushion material extends through the opening;
a cylindrical shaft extending generally perpendicular from the footing and defining a cylindrical opening therein, wherein the cylindrical shaft extends a distance so a distal end is at least coplanar with an exterior surface of the seat cushion, wherein the seat cushion material contacts an outer circumference along at least a portion of a length of the cylindrical shaft; and
a retention clip having an extension portion sized to be received and retained in the cylindrical opening by an interference fit to secure a component to the seat back.

7. The seat assembly of claim 6 wherein at least a second portion of the length of the cylindrical shaft extends beyond an exterior surface of the seat cushion.

8. The seat assembly of claim 6 wherein the attachment port includes a detent extending radially inward along a circumference of the cylindrical opening.

9. The seat assembly of claim 8 wherein the retention clip includes at least one tooth that extends radially from the extension portion, the at least one tooth engages the detent such that the interference fit comprises a snap-fit.

10. The seat assembly of claim 6 wherein the retention clip includes a connection portion for securing the retention clip to the component.

11. The seat assembly of claim 10 wherein the connection portion includes an arc-shaped profile for being coupled to a bar.

12. The seat assembly of claim 10 wherein the connection portion is coupled to a wiring harness.

13. The seat assembly of claim 6 wherein the attachment port further comprises first and second footings disposed in the seat cushion and extending from the central base in a direction generally perpendicular from the cylindrical shaft.

14. The seat assembly of claim 6 wherein first and second footings that are spaced apart from each other and have an arcuate arm with a web defined within the arcuate arm.

15. The seat assembly of claim 6 wherein the attachment port extends from a rear surface of the seat back.

16. A seat attachment assembly for attaching components to a seat cushion, the assembly comprising:
a central base having at least one footing with an opening adapted for being encapsulated in the seat cushion;
a cylindrical shaft extending generally perpendicular from the central base and defining a cylindrical opening therein, wherein the cylindrical shaft extends a distance so a distal end is at least coplanar with an exterior surface of the seat cushion; and
a retention clip having an extension portion sized to be received and retained in the cylindrical opening by an interference fit.

17. The seat attachment assembly of claim 16 wherein the cylindrical shaft includes a detent extending radially inward along a circumference of the cylindrical opening.

18. The seat assembly of claim 17 wherein the retention clip includes at least one tooth that extends radially from the extension portion, the at least one tooth engages the detent such that the interference fit comprises a snap-fit.

19. The seat attachment assembly of claim 16 wherein the at least one footing includes a plurality of webbed fingers that defines a webbed openings, the search cushion material extending through the plurality webbed openings to provide retention in the seat cushion.

20. The seat assembly of claim 16 wherein at least a second portion of the length of the cylindrical shaft extends beyond an exterior surface of the seat cushion.

* * * * *